United States Patent [19]

Uchino

[11] 3,942,665

[45] Mar. 9, 1976

[54] LOADING APPARATUS IN MOTOR TRUCK

[75] Inventor: Susumu Uchino, Tokorozawa, Japan

[73] Assignee: The Coca-Cola Company, Atlanta, Ga.

[22] Filed: Nov. 11, 1974

[21] Appl. No.: 522,961

[52] U.S. Cl. ............... 214/516; 104/172 B; 198/85; 214/520
[51] Int. Cl.² .......................................... B60P 1/00
[58] Field of Search ........ 214/83.26, 512, 516, 520; 198/85; 104/172 R, 172 B

[56] References Cited
UNITED STATES PATENTS

| | | | |
|---|---|---|---|
| 2,556,399 | 6/1951 | Sanger et al. | 214/83.26 |
| 2,636,446 | 4/1953 | Woodard | 104/172 B |
| 3,228,542 | 1/1966 | Achammer | 214/516 X |
| 3,346,132 | 10/1967 | Duszka | 214/516 |
| 3,802,588 | 4/1974 | Lutz | 214/519 |

Primary Examiner—Robert G. Sheridan
Attorney, Agent, or Firm—W. Dexter Brooks

[57] ABSTRACT

A loading apparatus in motor truck is described which is capable of moving loads on the truck in a rotational manner by means of a series of endless chains and wherein substantially all of the area of the truck bed is utilized without producing a dead space on the truck bed while performing loading and unloading operation. The loading apparatus is characterized in that two longitudinal tracks and a lateral track therebetween are mounted on the truck bed and each track is equipped with a unique lifting assembly. Each of the longitudinal tracks and lateral track include a pair of guide rails and a fixed load supporting member mounted there-between to the truck bed and which cooperate with its lifting assembly, such that when the guide rails are lowered by the lifting assembly, a moving load will be stabilized upon such fixed load supporting members and immobilized.

4 Claims, 4 Drawing Figures

LOADING APPARATUS IN MOTOR TRUCK

The present invention relates to a loading apparatus in a motor truck which is capable of moving loads on the truck in a rotational manner by means of endless chains and wherein substantially the entire area of the truck bed is utilized without producing a dead space on the truck bed while performing loading and unloading operations.

According to the present invention, a loading apparatus is provided in a motor truck in conjunction with the motor truck bed. Preferably, the motor truck is provided with a tailgate which can be raised and lowered bodily or by conventional elevator means. The loading apparatus is characterized in that guide rails comprising two longitudinal tracks and a lateral track therebetween are mounted on the truck bed and are equipped with a unique lifting assembly. Each of the longitudinal and lateral tracks include a pair of guide rails and a fixed load supporting mounted therebetween to the truck bed and which cooperate with the lifting assembly such that when the guide rails are lowered by the lifting assembly, the movable loads are stabilized upon such fixed load supporting members for immobilization of the loads. Each of the endless chains is provided with projections that are freely movable up and down on the chain and each of the chains is disposed in a middle groove that is provided within the fixed load supportng members that are located between the rails of each track such that each of the endless chains are exposed on the surface on the bed of the motor truck in the forward run of the chain.

In conventional loading apparatus for a motor truck which is capable of moving loads in a rotational manner in which the chain is provided in an elliptical shape in the plane of the bed and a load is transferred along said chain and unloaded from the truck, the transverse axis of said chain is long and the length of the body is extended accordingly, so that the loading apparatus is not efficiently operated on the truck which has a small loading area. Moreover, these conventional assemblies are of a much more sophisticated nature and fail to realiably fix a load supporting arrangement in conjunction with the rotationally operation for safe immobilization of any loads that are loaded and unloaded from the motor truck.

The patents to Kappen, U.S. Pat. No. 2,521,727, Chandler, U.S. Pat. No. 3,240,797, Weston, U.S. Pat. No. 3,559,831 and Bohman, U.S. Pat. No. 3,831,794 are indicative of the prior art and such sophisticated arrangements. While these conventional arrangements have been found to be quite practical under some circumstances where distribution only involves a limited number of different type or size loads, a small volume of loads, or the return of a small number of loads, many difficulties have been encountered under those circumstances where distribution had involved a plurality of different type or size loads, a large volume of loads or the return of a large volume of loads. These difficulties have primarily been due to the motor trucks not using all of the available space on the truck bed. Moreover, many problems have been encountered from a safety standpoint since in many cases the loads are not safely secured on the truck bed and quite frequently become mobile in relation to the truck bed during transit. Needless to say, many accidents have occurred as a result of such unrealiable securing means.

Accordingly, there has arisen a need in the industry for the production of a reliable and efficient loading apparatus for a motor truck, preferably of simple construction, having a lifting assembly that is capable of being utilzed quickly at all times during a distribution route, capable of accommodating loads of different types and sizes and supporting, handling and transporting such loads in a rotational manner on the truck bed by means of endless chains and wherein substantially the entire area of the truck bed is utilized without producing a dead space on the truck bed while performing loading and unloading operations.

The principal object of the present invention is to provide a loading apparatus in a motor truck which is capable of moving loads on the truck in a rotational manner by means of endless chains, which apparatus includes two longitudinal tracks and a lateral track positioned at the front of the truck bed and between the two longitudinal tracks.

Another object of the present invention is to provide a loading apparatus in a motor truck which employs guide rails that are associated with an endless chain assembly and lifting assembly such that when the guide rail and chain assemblies are raised or lowered, a load is provided, respectively, in a mobile or immobilized state on the truck bed.

Another object of the present invention is to provide a loading apparatus on a motor truck with endless chains which have projections that are freely movable up and down and which chains are disposed in a middle groove between a pair of guide rails such that during operation, the endless chain is exposed on the surface of the bed of the motor truck in the forward run of the chain.

Another object of the invention is to provide an apparatus for conducting loading and unloading operations by moving loads on a motor truck in a rotational manner by means of chains, wherein the entire area of the truck bed is utilzed without producing a dead space on the bed of the motor truck during the loading and unloading operations.

Another object of the present invention is to provide a loading apparatus for a motor truck in which the maximum load capacity of a flat bed carrier is utilized, at the same time permitting the selective loading and unloading of a load from the rear without the need for special handling equipment at the loading or unloading end.

A still further object of the present invention is to provide a means for securing a load at any position in its rotational movement on the truck bed and thus, prohibit movement of a load during transit. These other and further objects, important features, and advantages of the present invention to which attention has not specifically been directed hereinabove, will be better understood and appreciated by those skilled in the art from the following detailed description of the invention taken in conjunction with the accompanying drawngs, in which, FIG. 1 is a partially broken away plan view of a loading apparatus embodying the present invention.

Figure 1:
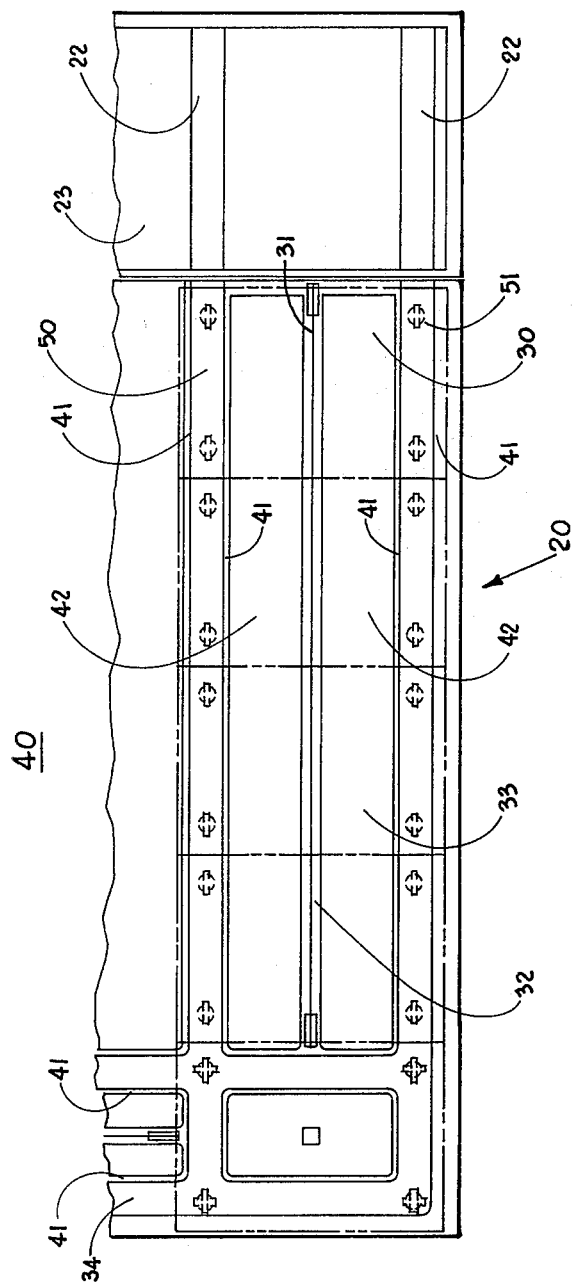
Figure 2:
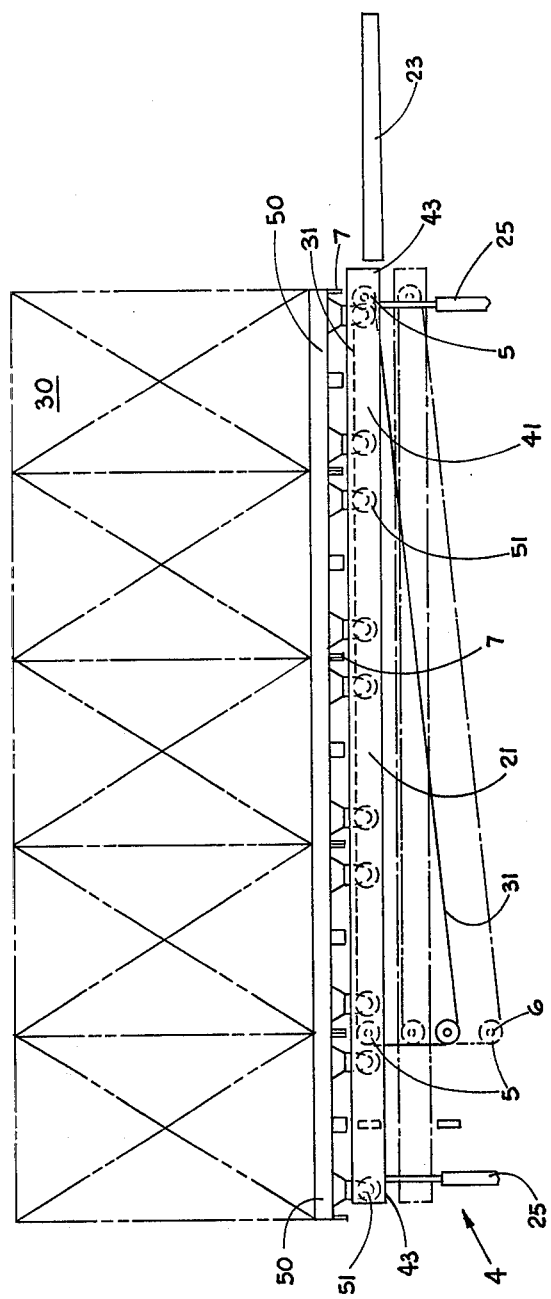
FIG. 2 is a side elevational view thereof.

Referring to the drawings in detail, and more particularly FIGS. 1 and 2, a loading apparatus 20 for a motor truck 40 is mounted in conjunction with a truck bed 21 for moving loads 30 on the motor truck 40 in a rotational manner by means of endless chains 31, and wherein substantially the entire area of the truck bed 21 is utilized without producing a dead space while performing loading and unloading operations.

Figure 3:
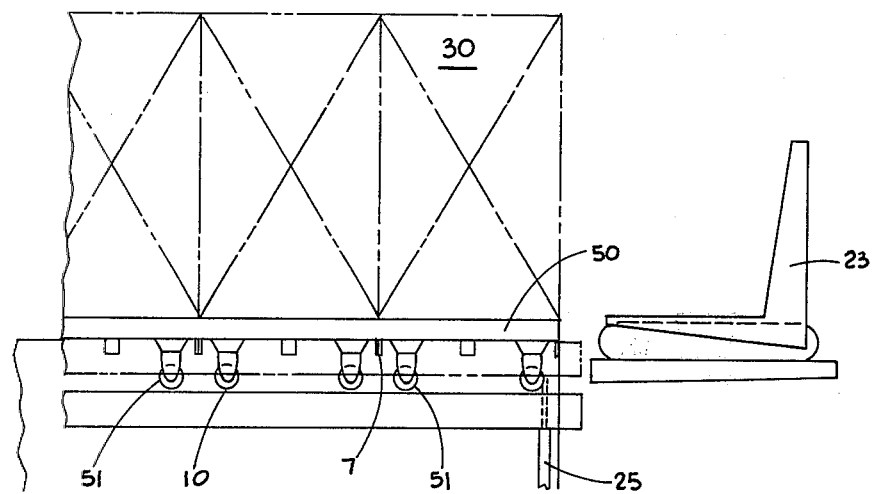
FIG. 3 is an illustrative view of the method of fixing a load when a motor truck is driven.
Figure 4:
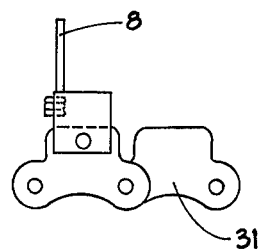
FIG. 4 is a side elevational view of a leaf spring element embodied as a part of the endless chains in the loading apparatus.

The loading apparatus, more specifically, comprises two longitudinal tracks 33 and a lateral track 34 positioned at the front of the truck bed 21. Each of the longitudinal tracks 33, as well as lateral track 34, includes a pair of spaced guide rails 41 that extend substantially throughout the respective entire longitudinal and lateral lengths of the truck bed 21. The longitudinal tracks 33 are positioned in alignment with the corresponding tracks 22 on tailgate 23. A fixed load supporting member 42 is mounted between each of the spaced guide rails 41 and to the truck bed 21. The fixed load supporting member 42 may be constructed as longitudinal columns, rails or any similar supporting members, so long as they are mounted parallel between the guide rails 41 and capable of supporting a loaded cart 50 in a stabilized position. An endless chain 31 is positioned within a middle groove 32 of each of the fixed load supporting members 42 for rotational movement of a load 30 around the entire area of the truck bed 21. The endless chains 31 are provided with projections 8 that are freely movable up and down such that the endless chains 31 are exposed on the surface of the truck bed in the forward run of the chain. The guide rails 41 are preferably formed of U-channel rail members so as to accommodate carts 50 having swivel castors 51 adaptable for movement within the U-channel guide rails 41 when the guide rails are in a raised position and in contact with the bottom surface of the castors 51. A lifting assembly 4 is provided in conjunction with the respective ends 43 of each longitudinal track 33 and lateral track 34 and associated with the guide rails 41, such that upon actuation of the lifting asssembly 4, the guide rails are raised or lowered in the desired fashion. During the raised position, the load is mobile and may be shifted along the guide rails 41 since the castors 51 are in contact with the rails. Of course, the bottom of the load is provided out of contact with the fixed load supporting members when the lifting assembly 4 is raised. However, when the lifting assembly is lowered as shown by dotted lines in FIG. 2, and more specifically in FIG. 3, the guide rails 41 are lowered out of contact with the bottom of the load, whether it be the bottom surface of the load 30 itself or the castors 51 of the cart 50. As depicted in FIG. 3, a space 10 is provided beneath each castor 51 in the lowered position. When this occurs, the load 30 becomes safely and securely positioned upon the fixed load supporting members 42 and is immobilized. An endless chain 31 is mounted within the groove 32 around a triangular arrangement of three sprockets 5 which are mounted on shaft members 6 in each of the two longitudinal runs and in the lateral truck of the loading apparatus 20. Each chain 31 is adapted to be moved up and down aong with its set of guide rails 41 by the lifting or elevating assembly 4 that is associated with that particular track. The endless chain 31 is provided with a plurality of leaf springs 8 by which a load 30 or cart 50 can be moved by grappling lugs 7 projecting downwardly from the edge of the cart 50 when the chain is actuated and driven through the lower drive sprocket 5 by a motor (not shown). The grappling lugs 7 are nudged forward by the leaf springs 8 and moved in a rotational fashion around the truck bed 21. The three sprockets 5 are journaled on each corner of the chain 31 so that the springs 8 may be disconnected smoothly from the engaging lug 7 to change th direction of said chain 31 to about 90° downwardly when the springs 8 have transferred the cart 50 to the intermost part of each track. While the chain 31 has been shown in engagement around three sprockets 5, it should be recognized that any number and array of sprockets 5 could be employed. Moreover, leaf spring 8 could easily be replaced by another type of projections arranged outside the chain 31 if so desired. In the preferred embodiment, lifting assembly 4 comprises a hydraulic piston rod assembly 25. Upon being activated, a pump (not shown) pushes a fluid against the piston rod and thereby raises and/or lowers the guide rails 41 in the desired manner, as the case may be.

Briefly describing the operation of the loading apparatus 20 on the motor truck, the lifting or elevating assembly 4 is driven upwardly and the bottom surface of a load 30, such as wheels 51 of a cart 50, are placed in contact with the guide rails 41. The endless chain 31 is then driven and the grappling lugs 7 of the cart 50 are pushed smoothly and lightly toward the front of the truck bed by leaf spring projections 8 of the chain. When this transferred operation is finished, the lifting or elevating device 4 is operated so that the guide rails 41 and chain 31 are moved downwardly to fix the cart 50 safely and securely on the fixed load supporting member 42. This phenomena occurs by virtue of locating the wheels 51 apart from the guide rails 41 and stabilizing the intermost part of the load or cart 50 upon the fixed load supporting member 42. Such a loading apparatus allows the cart 50 to be transferred within the truck body without changing the direction in loading and unloading operation and, therefore, the narrow bed of a truck can be used more efficiently as the loading space. Moreover, the unique liftng and elevating assembly 4 allows the cart 50 to be secured during transit without the use of sophisticated rigging or dunnage arrangements.

It should be manifest that while the preferred embodiment of the present invention has been shown and described for illustrative purposes, the present invention is capable of wide variation. For example, instead of a motor truck the present invention is capable of being incorporated in a trailer body or any other high capacity vehicle that is used for the movement of a load, wherein it is desired to use all of the available storage and load capacity, and/or when it is desired to safely secure the load on the truck bed with relative ease. Also, while the preferred embodiment illustrates the use of a hydraulic means for raising or lowering the guide rails 41 and chain assembly 31, any other well-known elevating means could be used, such as a pneumatic, electrical or mechanical arrangement.

It is believed that the present invention, its mode of construction, assembly and operation, and many of its advantages attendant thereto should be readily understood from the foregoing without further description and it should also be manifest that, while a preferred embodiment of the invention has been shown and described for illustrative purposes, the structural details are nevertheless capable of a wide variation within the purview of the invention as defined in the appended claims.

The embodiment of the invention in which an exclusive property right or privilege is claimed are defined as follows:

1. A loading apparatus for a motor truck having a load supporting truck bed which is capable of moving loads on the load supporting truck bed in a rotational manner comprising two longitudinal tracks on opposite sides of the truck bed in spaced relationship and substantially covering the entire bed area of said truck with the exception of a void area at least approximately the size of the area covered by one load, and a lateral track that is positioned at the front of the truck bed between said longitudinal tracks substantially covering said void area, each of the longitudinal tracks and lateral track including a pair of spaced guide rails that extend substantially throughout the respective entire longitudinal and lateral lengths of the truck bed, a fixed load supporting means having a centrally located parallel groove being secured between each pair of guide rails secured to the truck bed, an endless chain assembly means positioned within the centrally located groove of said fixed load supporting member and being adapted to engage a movable load for rotational movement of the load around the entire area of the truck bed, each end of said longitudinal and lateral tracks being provided with a corresponding lifting means that is located directly below the truck bed and in contact with the respective end of each guide rail, such that upon actuation of the lifting means, the end of the guide rail in contact therewith is raised or lowered in the desired fashion.

2. A loading apparatus for a motor truck as defined in claim 1, wherein the lifting means comprises hydraulic means located at the respective ends of each of the longitudinal tracks and lateral track and associated with its corresponding guide rails, such that upon actuation of the lifting means in a lowered position, the hydraulic means allows its corresponding guide rail end to be lowered out of contact with the movable load, in which event, the movable load is stabilized against the fixed load supporting means.

3. A loading apparatus for a motor truck as defined in claim 2, wherein the endless chain assembly means is secured on a first sprocket located below the truck bed at one end of the centrally located groove and a second sprocket located below the truck bed at the opposite end of the centrally located groove, and wherein an additional drive third sprocket is located directly beneath the first forward sprocket so as to provide a triangular arrangement of three sprockets, and thus provide the endless chain assembly with a more effective pulling force when the drive sprocket is actuated.

4. A loading apparatus for a motor truck as defined in claim 2, wherein the spaced guide rails are formed of U-channel rail members so as to accommodate moving loads having a plurality of castors thereon, and wherein each end of said U-channel rail members are provided with a corresponding hydraulic means for lifting or raising each end of said U-channel rail members in the desired fashion.

* * * * *